UNITED STATES PATENT OFFICE.

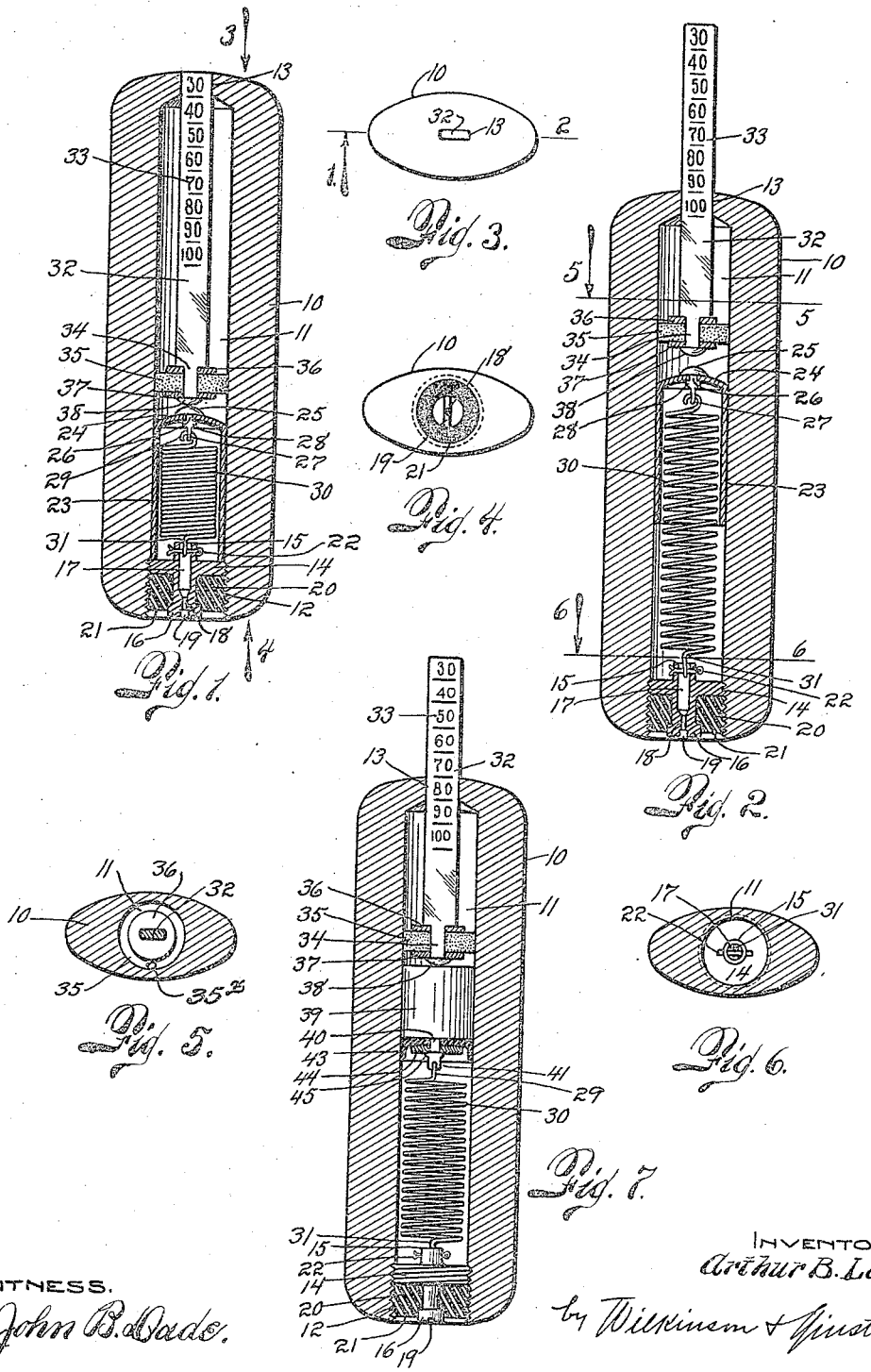

ARTHUR B. LOW, OF DENVER, COLORADO.

PRESSURE GAUGE.

1,422,278.  Specification of Letters Patent.  Patented July 11, 1922.

Application filed August 4, 1921. Serial No. 489,818.

*To all whom it may concern:*

Be it known that I, ARTHUR B. LOW, a citizen of the United States, residing at the city and county of Denver and State of Colorado, have invented certain new and useful Improvements in Pressure Gauges, of which the following is a specification.

This invention embodies improvements in pressure gauges for indicating the pressure within an inflated pneumatic tire for automobiles or analogous vehicles, although it is to be understood that the improved article may be used also, should occasions arise, in other relations where a pressure chamber provides a suitable nipple and stem controlled valve therefor.

The primary aim of the invention has been to devise such a pressure gauge that will not only fulfill all of the requirements demanded thereof, but which also is of comparatively small dimensions and with a minimum number of cooperating parts little liable to get out of order or otherwise improperly function, one which is self-contained with smoothly finished and ornate exterior, and which as a whole is so compact as to occupy inconsequential space when stored in the pocket or otherwise.

In an earlier Patent, No. 1392587 of Oct. 4, 1921, I have disclosed a pressure gauge wherein a tubular indicator or gauge bar is normally supported loosely upon a piston having a guide stem, with a coiled spring also supported by said piston, in encompassing association with said gauge bar and guide stem, and which coiled spring in turn mounts a retaining washer held seated thereby at the upper end of the casing in yielding frictional engagement with said tubular indicator, all of which elements function as therein set forth, but in that case the coiled spring is normally distended and is of a substantial length compressed upon the ascent of the piston.

In the present case, although somewhat analogous to the device aforesaid, there has been a substantial rearrangement of the elements, including the disposition and mounting of the gauge bar retaining means and the provision of a normally compressed coiled spring that is disposed below the piston element, which coiled spring is distended upon the ascent of the piston element, so that I am thus enabled to employ an exceedingly light retractile spring of comparatively short length.

In addition to the foregoing features, the compactness of the device, its simplicity in assembling and operation, and the comparatively small cost of manufacturing and marketing the same, other objects and advantages will be apparent as incidental to the following disclosure, and with these prefacing remarks reference will now be had to the accompanying drawings, illustrating practical embodiments of the improvements, in which drawings—

Figure 1 is a longitudinal sectional view through the device as it appears when not in use, the section being taken along the plane of the line 1—2 of Fig. 3, the illustration being on a greatly exaggerated scale; Figure 2 is a substantially analogous view, but with the piston shown as being retracted, while the gauge bar is maintained elevated in set position for reading, when the device has been applied in use and detached; Figures 3 and 4 are top and bottom plan views as respectively indicated by the arrows 3 and 4; Figures 5 and 6 are transverse sectional views taken, respectively, along the planes of the lines 5—5 and 6—6 of Fig. 2; and Figure 7 is a view substantially analogous to Fig. 2 but illustrating a slightly modified construction.

10 designates the casing, providing an open-ended longitudinal chamber 11 therethrough which may be internally threaded at one end, as at 12, while its other end is smooth and is restricted, as at 13, to conform with the cross-sectional shape of the gauge bar.

In so far as the instant improvements are concerned, the casing might be of other cross-section than shown, and in fact the casing 10 and the chamber 11 might be provided for by an ordinary short tube section, properly capped at the top and plugged at the bottom, but from other more desirable aspects the chamber 11 is preferably formed as a longitudinal bore through an otherwise solid blank of light metal, such as aluminum, of the elongated elliptical design as illustrated, and being rounded off to form exterior top and bottom faces of substantially convex conformation, the whole providing an extremely short length casing that is not only of conveniently shaped design but which is also attractively smooth finished. Also, while the open end 13 is shown as a slot, to permit of the guided passage of a gauge bar of flat wire conformation, it is obvious that the aperture 13 might be of other forms adapted for the reception of a gauge bar of other shapes in cross-section.

The plug closure for the threaded lower end 12 of the casing is substantially the same as that described with reference to my patent aforesaid, and embodies an externally threaded base disk 14 having a boss 15 formed on its inner face while its outer face provides a shank terminating in a contact head 16, of less diameter than the base 14 but of greater diameter than the shank portion. All of these plug closure parts are preferably formed integral, and a small axial bore 17 extends therethrough and through the boss 15, opening at its innner end to the chamber 11, while at its outer end merging into a minutely restricted inlet bore 18 that in turn terminates in a diagonal groove or recess 19, provided at the outer face of the head 16, which groove 19 functions both as a passage for air to said inlet bore and as a means for receiving the end of a screwdriver, or analogous implement for obvious purposes.

20 is a gasket of rubber, or other suitable substitute, centrally apertured to fit over the shank portion between the disk 14 and the head 16, and provides an outer seating face 21 surrounding but slightly inset from the head 16, it being understood that the head 16 serves as a contact means for engaging the projecting stem of an inflation valve, while the face 21 seats down snugly on the valve casing nipple to prevent any leakage of pressure, excepting the escape into the gauge, when the inflation valve is opened by the head 16.

The bored nipple or boss 15 is transversely apertured to receive a fastening pin 22, shown as a cotter pin, for attaching the lower end of the coil spring element later referred to, but this is primarily by way of illustration only as other fastening means may be satisfactorily employed.

Although fully explained in my patent aforesaid, it may be stated herein that the object of making the bore 17 of greater diameter than the inlet bore 18, which is of about the diameter of a very fine needle, is that should the inlet bore become clogged with dirt, the same would most likely be blown clear by the air pressure, or at any event could be removed readily with a straw or other fine article, as the inlet bore 18 only extends a slight distance from the recess 19 before it merges into the larger bore 17.

Within the chamber 11, and normally disposed immediately above the plug closure, there is located a piston element, shown at Figs. 1 and 2 as embodying an elongated downwardly opening shell 23, which fits the chamber 11 with sufficient snugness to prevent undue pressure leakage therearound while freely sliding therein, and this elongated piston shell provides a closed top wall 24 that may be centrally apertured to receive a rivet element comprising a head 25, a shank 26 and a reduced terminal 27.

When the rivet shank is inserted through the apertured top wall of the piston shell, the lower end of the shank proper is peened over, as at 28, up against the underneath face of the shell top, thus securely fastening the same, while the reduced terminal 27, which may be likened to a flattened teat, projects substantially within the shell and is transversely apertured to receive the upper hooked end 29 of a retractile coil spring 30, the lower end 31 of which is anchored to the plug closure as by hooking over the transverse pin 22, of the hollow boss 15, with sufficient clearance to allow for the free passage of the pressure air through the hollow boss and into the piston shell 23 within the chamber 11. In the arrangement described, it will be noted that the spring ends are bent radially and then axially so that the hooks are in axial line with the piston shell and the plug closure, whereby the tension on the piston shell is in direct lines with reference to the encompassing chamber 11, and thus avoids any tendency towards binding. While the foregoing arrangement may be said to be the preferred means for attaching the spring ends, it is obvious that other attaching means might be employed, but at any event it will be noted that the spring is of a diameter only a trifle less than the approximate diameters of the piston shell and chamber 11, while the length of the spring normally in its compressed state is such as to be wholly encompassed within the piston shell, as in Fig. 1. The spring, therefore, may be formed of comparatively light resilient wire of many convolutions, which not only aids the efficiency of the spring but prolongs its life as to efficiency.

32 indicates the gauge bar, having the pressure indicating scale face 33, the upper portion of which operates through and is guided by the slot 13, while the lower end has a reduced terminal or neck 34, around which fits a washer 35, of leather, felt, cork or any satisfactory material, held in place by the upper and lower metal disks 36 and 37, respectively, the outer end of the neck 34 being finally peened over as at 38, holding all of these parts fixedly secured. Obviously, however, it would be an equivalent if 38 was the head of a stud screw associated with a threaded bore in the neck 34.

The washer 35 serves dually both as a guide for the lower end of the gauge bar and as a retaining means to maintain the gauge bar in set position for reading, when elevated by the operating pressure being tested and until it is pushed down into its normal position by manual manipulation after the piston has been retracted by its coil spring 30. Thus the gauge is a registering one, which may be read after the gauge has been removed from association with the tire the internal pressure of which is being tested. The washer 35 being substantially snug-fitting, however, it would doubtless be desirable to provide at least one small air-relieving aperture therethrough, as would be indicated at 35× of Fig. 5, or a vertical peripheral groove which would be its equivalent, to prevent any tendency towards the trapping of cushioning air in the space between the washer and the piston element.

In the slightly modified form shown at Fig. 7, the same reference numerals have been employed to indicate the same parts as heretofore described, but in this form of device the elongated piston shell 23, of the other figures, is substituted for by an equivalent although slightly different arrangement.

In this view 39 indicates a piston guiding head that may be cylindrical and solid, and which provides a central depending stud 40 that terminates in the flattened teat 41. A downwardly disposed cupped piston washer 43, of suitable leather or analogous substance, is centrally apertured to fit over the stud 40, and is firmly seated up against the underneath surface of the piston head 39 by a metal washer or disk 44, that in turn is held in place by peening over the shoulder, as at 45, that is formed by the end of the stud proper where it merges into the reduced terminal or flattened teat 41. Obviously, a stud screw as heretofore referred to, but with the terminal teat 41, would serve the same end of fastening the cupped piston washer in place. The element 41 is apertured transversely, as will be understood, to receive the spring hook end 29.

The operation of the device will be self-evident but may be briefly summarized as follows:—When the gauge is associated with the nipple of an inflation valve casing, the contact head 16 engaging the projecting end of the stem of the valve will open the latter, while the face 21 of the gasket 20 seats down snugly on the top edge of the valve casing, whereupon the pressure air in the pneumatic tire will escape only into the gauge casing below the piston element thereof by way of the conduit 19—18—17, and in operating the piston element upwardly, against the tension of the normally compressed spring 30, the piston element in turn will elevate the indicator or gauge bar 32. The now distended coil spring 30 will immediately retract the piston element, when the air pressure is relieved by the removal of the gauge from the tire valve, but the gauge bar itself remains set in registering position as at Figs. 2 and 7, by the retaining guide washer or element 35 in yielding frictional engagement with the wall of the chamber 11, until forced down again by external means. Of course, it is understood that the coil spring is proportionately tensioned relatively to the indicator scale to properly register the air pressure.

Having thus fully disclosed my invention, it will nevertheless be understood that I do not wish to limit myself unnecessarily to the exact details of construction as shown and described, excepting as they may come within the terms of the ensuing claims or a fair interpretation thereof, viewed in the light of the specification if necessary.

What I do claim as new and patentable is:—

1. A pressure gauge of the character disclosed, embodying a casing that provides a longitudinal chamber opening to a top guiding aperture and having a bottom closure provided with a duct therethrough and including a valve stem contacting element and a surrounding seating face, an elongated indicator operating at its outer end through said top guiding aperture and towards its inner end provided with a combined centering, guiding and retaining element slidingly associated with the wall of said chamber in yielding frictional contact therewith, actuating means adapted only for outwardly operating said indicator with its retaining element by pressure fluid admitted through said duct, and retractile means for said actuating means.

2. A pressure gauge of the character disclosed, embodying a casing that provides a longitudinal chamber opening to a top guiding aperture and having a bottom closure provided with a duct therethrough and including a valve stem contacting element and a surrounding seating face, an elongated indicator operating at its outer end through said top guiding aperture and towards its inner end carrying a combined centering, guiding and retaining washer of yielding material frictionally engaging the wall of said chamber, a piston element freely interposed between said duct and indicator for actuating said indicator and its retaining washer, in an outward direction only, by pressure fluid admitted through said duct, and retractile means for said piston element.

3. A pressure gauge of the character disclosed, embodying a casing that provides a longitudinal chamber opening to a top guiding aperture and having a bottom closure provided with a duct therethrough and including a valve stem contacting element and a surrounding seating face, an elongated indicator operating at its outer end through said top guiding aperture, into registering position, and towards its lower end carrying a combined centering, guiding and retaining washer of yielding material frictionally engaging the wall of said chamber, a piston element in said chamber, operatively associated with said duct and freely interposed with reference to said indicator, for actuating said indicator and its retaining washer, into registering position only, by pressure fluid admitted through said duct, the said piston element providing a hollow interior with a closed top and a downwardly opening bottom, and a normally compressed coil spring disposed in the lower end of said chamber and connecting said piston element with the lower end of said casing.

In testimony whereof, I affix my signature.

ARTHUR B. LOW.